United States Patent
Bischoff et al.

(10) Patent No.: US 9,133,615 B2
(45) Date of Patent: Sep. 15, 2015

(54) SOUNDPROOFING ASSEMBLY, IN PARTICULAR FOR A MOTOR VEHICLE

(75) Inventors: Lars Bischoff, Hamburg (DE); Arnaud Duval, Charleville-Mezieres (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 0 days.

(21) Appl. No.: 14/240,002

(22) PCT Filed: Aug. 21, 2012

(86) PCT No.: PCT/EP2012/066257
§ 371 (c)(1),
(2), (4) Date: Feb. 20, 2014

(87) PCT Pub. No.: WO2013/026847
PCT Pub. Date: Feb. 28, 2013

(65) Prior Publication Data
US 2014/0332313 A1    Nov. 13, 2014

(30) Foreign Application Priority Data

Aug. 24, 2011 (FR) ..................... 11 57500

(51) Int. Cl.
| | |
|---|---|
| *F02B 77/13* | (2006.01) |
| *E04B 1/84* | (2006.01) |
| *G10K 11/168* | (2006.01) |
| *B32B 27/06* | (2006.01) |

(Continued)

(52) U.S. Cl.
CPC .............. *E04B 1/8218* (2013.01); *B32B 7/02* (2013.01); *B32B 27/065* (2013.01); *B32B 27/12* (2013.01); *G10K 11/168* (2013.01); *B32B 2307/102* (2013.01); *B32B 2307/50* (2013.01); *B32B 2307/718* (2013.01); *B32B 2307/7244* (2013.01); *B32B 2605/08* (2013.01)

(58) Field of Classification Search
USPC ......... 181/290, 291, 294, 204, 205; 296/39.3, 296/181.6, 211
See application file for complete search history.

(56) References Cited

U.S. PATENT DOCUMENTS 5,094,318 A * 3/1992 Maeda et al. ............ 181/290
5,153,388 A * 10/1992 Wittenmayer et al. ...... 181/290

(Continued)

FOREIGN PATENT DOCUMENTS

| EP | 1902904 A1 * | 3/2008 | ............ B60R 13/08 |
| EP | 2 159 786 A1 | 3/2010 | |

(Continued)

OTHER PUBLICATIONS

International Search Report issued in Application No. PCT/EP2012/066257, mailed Apr. 25, 2013, 2 pages.

*Primary Examiner* — Edgardo San Martin
(74) *Attorney, Agent, or Firm* — Arent Fox LLP

(57) ABSTRACT

This assembly includes an elastic and porous base spring layer intended to be placed facing a surface, in particular of an automobile vehicle, and an intermediate insulation layer impervious to the passage of air, the intermediate layer being positioned on the base spring layer. The airproof intermediate layer has a surface mass density of less than 500 g/m², the sound proofing assembly including a porous stiffening layer, positioned in contact with the impervious intermediate layer. The porous stiffening layer has a smaller thickness than the thickness of the base spring layer and a flexural stiffness, reduced to a unit width, of more than 0.01 N.m.

15 Claims, 4 Drawing Sheets

(51) Int. Cl.
  *B32B 27/12* (2006.01)
  *B32B 7/02* (2006.01)
  *F02B 77/11* (2006.01)
  *E04B 1/82* (2006.01)

(56) References Cited

U.S. PATENT DOCUMENTS

| | | | | |
|---|---|---|---|---|
| 5,258,585 | A | * | 11/1993 | Juriga ............................ 181/286 |
| 5,536,556 | A | * | 7/1996 | Juriga ............................ 428/138 |
| 6,145,617 | A | | 11/2000 | Alts |
| 7,201,253 | B2 | * | 4/2007 | Duval et al. .................... 181/204 |
| 7,318,498 | B2 | * | 1/2008 | Woodman et al. ............. 181/290 |
| 7,591,346 | B2 | * | 9/2009 | Thompson et al. ............. 181/291 |
| 7,690,480 | B2 | * | 4/2010 | Mori et al. ..................... 181/290 |
| 7,789,197 | B2 | * | 9/2010 | Duval et al. .................... 181/290 |
| 8,695,757 | B2 | * | 4/2014 | Duval et al. .................... 181/290 |
| 2005/0016793 | A1 | * | 1/2005 | O'Regan et al. ............... 181/290 |
| 2006/0289231 | A1 | * | 12/2006 | Priebe et al. .................... 181/290 |
| 2008/0001431 | A1 | * | 1/2008 | Thompson et al. ......... 296/187.01 |
| 2010/0006372 | A1 | * | 1/2010 | Bischoff et al. ................ 181/290 |
| 2012/0037447 | A1 | * | 2/2012 | Duval et al. .................... 181/290 |

FOREIGN PATENT DOCUMENTS

| | | | | |
|---|---|---|---|---|
| EP | 2159786 A1 | * | 3/2010 | ........... G10K 11/168 |
| FR | 2906637 A1 | * | 4/2008 | ........... G10K 11/168 |
| WO | WO 03069596 A1 | * | 8/2003 | ........... G10K 11/168 |
| WO | WO 2007006950 A1 | * | 1/2007 | ........... G10K 11/168 |
| WO | WO 2009068804 A1 | * | 6/2009 | |
| WO | WO 2010/094897 A2 | | 8/2010 | |
| WO | WO 2010094897 A2 | * | 8/2010 | |

* cited by examiner

SOUNDPROOFING ASSEMBLY, IN PARTICULAR FOR A MOTOR VEHICLE

CROSS-REFERENCE TO RELATED APPLICATIONS

This application is a National Stage entry of International Patent Application No. PCT/EP2012/066257, filed Aug. 21, 2012, which claims priority to French Patent Application No. 11 57500, filed Aug. 24, 2011. The disclosures of the prior applications are hereby incorporated in their entirety by reference.

The present invention relates to a sound proofing assembly, in particular for an automobile vehicle, of the type comprising:
- an elastic and porous base spring layer, intended to be placed facing a surface, in particular of an automobile vehicle;
- an intermediate layer impervious to the passing of air, the intermediate layer being positioned on the base spring layer.

Such an assembly is intended to solve acoustic problems posed in a substantially closed space, such as the passenger compartment of an automobile vehicle (carpets, pavilion, door panel, etc.), in the vicinity of noise sources such as an engine (bulkhead, etc.), contact of tires with a road (wheel passage, etc.), etc.

Generally, in the low frequency domain, acoustic waves generated by the aforementioned sources of noise are subject to <<damping>> by materials in the form of simple or double sheets (pre-stressed sandwich) having a viscous-elastic behavior or by acoustic attenuation from a porous and elastic mass-spring system.

BACKGROUND OF THE INVENTION

In the sense of the present invention, a sound proofing assembly ensures <<insulation>> when it prevents the entry of acoustic waves at medium and high frequencies into the soundproof space, essentially by reflecting the waves towards the sources of noise or the outside of the soundproof space.

A sound proofing assembly operates by <<acoustic absorption>> (in the medium and high frequency domain) when the energy of the acoustic waves dissipate in an absorbent material.

A performing sound proofing assembly should operate both by ensuring good insulation and by absorption. In order to characterize the performance of such an assembly, the notion of sound reduction index NR is used which takes into account both notions of insulation and of absorption: this index may be calculated with the following equation:

$$NR\ (dB) = TL - 10\log(S/A)$$

wherein TL is the acoustic attenuation index (attenuation index hereafter) expressing insulation. The higher this index, better is the insulation.

A is the equivalent absorption surface area. The higher A, better is the absorption.

In order to achieve good sound proofing for example for an automobile passenger compartment, it is desirable to apply an assembly of materials which will give the possibility of suitably acting on both of these notions. This was described in many articles, in particular in the article <<Faurecia Acoustic Light-weight Concept>> by A Duval in 2002 during the SIA/CTTM 2002 conference in Le Mans.

In order to provide good acoustic insulation, the use of assemblies of the mass-spring type formed with a porous and elastic base layer is known, on which is placed an impervious layer with a heavy mass. This impervious layer of heavy mass generally has a high surface mass, in particular greater than 1 kg/m$^2$. and an also high specific gravity of the order of 1,500 kg/m$^3$ to 2,000 kg/m$^3$.

Such acoustic assemblies provide good acoustic insulation, but are relatively heavy. Moreover their behavior is not very performing in absorption.

Moreover, in order to lower the mass of a sound proofing assembly, patent U.S. Pat. No. 6,145,617 describes an acoustic assembly of the <<bi-permeable>> type, in which the heavy mass layer is replaced with a porous layer. Such an assembly actually lightens the structure of the vehicle but especially proves to be effective in absorption and does not provide satisfactory insulation, as compared with a traditional mass-spring system.

Many attempts have been made for proposing a sound proofing assembly which is both sufficiently lightweight and sufficiently effective in insulation and absorption, i.e. providing a good attenuation index regardless of the frequencies.

However, the performances of the advanced solutions still remain insufficient, this essentially because of the insulation behavior which is lacking.

SUMMARY OF THE INVENTION

An object of the invention is therefore to obtain a sound proofing assembly for an automobile vehicle, which is very lightweight, while guaranteeing a good attenuation index essentially by means of an acoustic insulation substantially equivalent to that of a mass-spring system.

For this purpose, the object of the invention is an assembly of the aforementioned type, characterized in that the impervious intermediate layer has a surface mass density of less than 500 g/m$^2$, in particular comprised between 50 g/m$^2$ and 400 g/m$^2$, the sound proofing assembly including a porous stiffening layer positioned in contact with the impervious intermediate layer, the porous stiffening layer having a thickness of less than the thickness of the base spring layer and flexural stiffness, reduced to a unit width, of more than 0.01 N·m.

The assembly according to the invention may comprise one or several of the following characteristics, taken individually or according to all technically possible combinations:
- the flexural stiffness (B) is greater than 0.1 N·m, advantageously less than 1 N·m, in particular comprised between 0.1 N·m and 0.4 N·m or comprised between 0.6 N·m and 1N·m,
- the flexural stiffness is greater than 1.5 N·m, in particular comprised between 1.5 N·m and 2.5 N·m, in particular greater than 3 N·m.
- the surface mass density of the porous stiffening layer is greater than 400 g/m$^2$ and is advantageously less than 1,800 g/m$^2$,
- the surface mass density of the impervious intermediate layer is greater than 210 g/m$^2$, and is advantageously comprised between 250 g/m$^2$ and 400 g/m$^2$,
- it includes a porous upper layer positioned on the porous stiffening layer, the porous upper layer having a thickness greater than that of the porous stiffening layer,
- it includes an outer resistive layer having a resistance to air passage comprised between 200 N·m$^{-3}$·s and 1,200 N·m$^{-3}$·s,
- it includes a decorative layer, advantageously formed with a carpet or a textile decoration, the decorative layer being positioned above the porous stiffening layer or above the outer resistive layer, it includes a decorative layer, advantageously, a carpet or a textile decoration applied above the porous stiffening layer, the impervious intermediate layer has a thickness of less than the thickness of the porous stiffening layer, the base spring layer is formed with a porous foam layer, the impervious intermediate layer being formed by impregnation of the foam forming the base spring layer in the porous stiffening layer, the impervious intermediate layer is formed with a layer extruded on the porous stiffening layer, the impervious intermediate layer is formed by melting a dispersed material deposited on the porous stiffening layer, or by local melting of the porous stiffening layer, the resistance to the passing of air of the porous stiffening layer is comprised between 400 N·m$^{-3}$·s and 6000 N·m$^{-3}$·s, advantageously between 2,000 N·m$^{-3}$·s and 5,000 N·m$^{-3}$·s, the thickness of the porous stiffening layer is less than 70% of the thickness of the base spring layer, in particular comprised between 20% and 50% of the thickness of the base spring layer, the thickness of the impervious intermediate layer being less than or equal to the thickness of the porous stiffening layer, the flexural stiffness is greater than 0.4 N·m, advantageously greater than 0.6 N·m.

BRIEF DESCRIPTION OF THE DRAWINGS

The invention will be better understood upon reading the following description, only given as an example and made with reference to the appended drawings, wherein.

DETAILED DESCRIPTION OF THE INVENTION

In all the following, the orientations are generally the usual orientations of an automobile vehicle. However the terms of <<above>>, <<over>>, <<below>>, <<under>>, <<upper>> and <<lower>> are relatively understood with respect to the reference surface of the automobile vehicle, facing which the sound proofing assembly is positioned. The term of <<lower>> is thus understood as being located very close to the surface and the term of <<upper>> as being located the farthest away from this surface.

Figure 1:
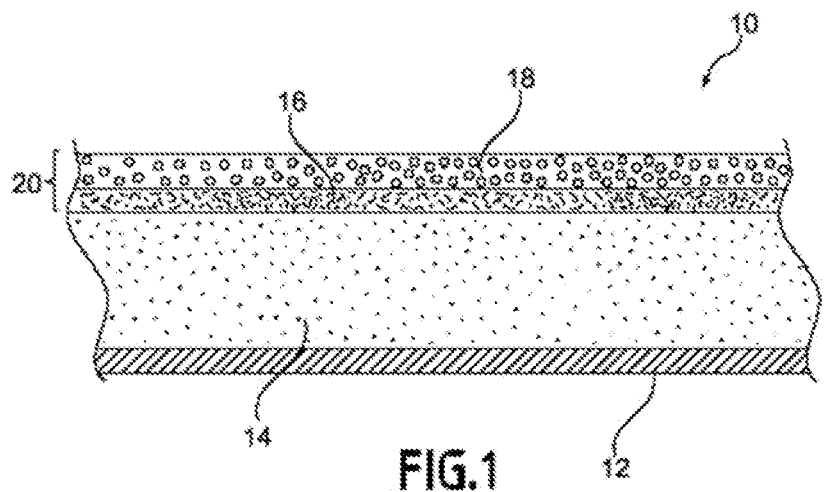
FIG. 1 is a transverse sectional view of a first sound proofing assembly according to the invention, positioned on a surface of an automobile vehicle.

A first sound proofing assembly 10 according to the invention is illustrated in FIG. 1. This assembly 10 is intended to be positioned facing a surface 12 of an automobile vehicle.

The surface 12 is for example a metal sheet surface of the vehicle in particular defining a floor, a ceiling, a door, a bulkhead separating the passenger compartment from the engine compartment, a hood, or a wheel passage of an automobile vehicle.

The assembly 10 is intended to be directly applied on the surface. It may be attached on the surface 12, advantageously by means of pins (for example in the case of a bulkhead) or laid on the latter (for example in the case of a carpet). In one alternative, the assembly is adhesively stuck on the surface 12.

As illustrated by FIG. 1, the sound proofing assembly 10 includes from bottom to top in FIG. 1, a porous and elastic base spring layer 14, an impervious insulation intermediate layer 16 and a stiffening layer 18, the layer 16 and 18 forming a complex 20 which is substituted for a heavy mass layer.

Alternatively (not shown), the sound proofing assembly 10 further includes a decorative layer, such as for example a decoration or a carpet positioned above the layer 18.

In this example, the base spring layer 14 is made on the basis of an elastic or further viscous-elastic porous foam.

This foam is advantageously with open cells. For example it is made in polyurethane. This foam is advantageously injected.

The base spring layer 14 is porous and has adapted porosity so as to have a resistivity to the passage of air advantageously comprised between 10,000 N·m$^{-4}$·s and 90,000 N·m$^{-4}$·s in particular equal to about 30,000 N·m$^{-4}$·s.

The resistance to the passage of air or its resistivity is measured by the method described in the thesis "Mesures des paramètrescaractérisant un milieu poreux. Etude expérimentale du comportementacoustique des mousses aux basses fréquences.", (Measurements of parameters characterizing a porous medium. Experimental study of the acoustic behavior of foams at low frequencies) of Michel HENRY, submitted on Oct. 3, 1997 at the University of Le Mans.

In the case of foam, the specific gravity of the layer 14 is comprised between 30 kg/m$^3$ and 70 kg/m$^3$ and in particular about 50 kg/m$^3$.

The thickness of the base spring layer 14, taken perpendicularly to the surface 12 is advantageously comprised between 5 mm and 30 mm, for example between 10 mm and 15 mm.

In order to show the spring properties, the base spring layer 14 advantageously has an elastic modulus greater than 10,000 Pa. This modulus is advantageously comprised between 20,000 Pa and 100,000 Pa, in particular between 30,000 Pa and 40,000 Pa.

The porous stiffening layer 18 is for example formed with a stiff compressed felt or with a stiff textile.

By <<felt>>, is understood, in the sense of the present invention, a mixture of base fibers and of binder. The fibers may be noble and/or recycled fibers, either natural or synthetic, of single or several natures. Examples of natural fibers which may be used are flax, cotton, hemp, bamboo etc. Examples of synthetic fibers which may be used are glass fibers, Kevlar, polyamide, acrylic, polyester, polypropylene.

The binder is for example a resin or binding fibers which have a Melting point below that of the base fibers to be bound. Examples of resins are epoxy resins or phenolic resins. Examples of binding fibers are polypropylene, polyethylene, polyamide, polyester or two-component polyesters.

In one alternative, the felt comprises a high percentage of microfibers, for example more than 50% and advantageously 80% of microfibers.

By <<microfibers>>, are meant fibers with sizes of less than 0.9 dtex, advantageously 0.7 dtex.

In one alternative, the felt contains recycled material, for example stemming from waste of internal or external origin, in particular scraps of parts of automobile equipment, manufacturing scrap, or end-of-life vehicle parts. These wastes are for example milled and incorporated into the felt in the form of pieces of divided material formed by agglomerates, flakes or particles. The components of the waste may be separated before or during the milling.

By textile, is meant a web of fibers essentially based on a thermoplastic polymer such as polypropylene, polyesters or further mechanically assembled polyamides by needling without the use of binders of chemical nature. Such a web may contain a percentage of thermoplastic recycled fibers or of natural origin.

Alternatively, the porous stiffening layer 18 is made on the basis of a slitted foam with open cells. For example, it is made in polyurethane.

In one alternative, the slitted foam also contains recycled material, as defined above, and/or a mineral filler and/or 'bio-polyol'.

The thickness of the porous stiffening layer 18 is for example comprised between 1 mm and 15 mm, and is in particular comprised between 5 mm and 10 mm.

This thickness is less than 70% of the thickness of the base spring layer 14. Advantageously, this thickness is comprised between 20% and 50% of the thickness of the base spring layer.

In the case of a felt porous stiffening layer 18, the surface mass density of the layer 18 is greater than 400 $g/m^2$ and is comprised between 400 $g/m^2$ and 1,800 $g/m^2$, advantageously between 1,000 $g/m^2$ and 1,400 $g/m^2$. In the case of a foam porous stiffening layer 18, the density of the layer 18 is advantageously comprised between 10 $kg/m^3$ and 180 $kg/m^3$.

The porosity of this layer 18 is selected so that the resistance to the passage of air of this layer is greater than 400 $N·m^{-3}·s$ and is advantageously comprised between 400 $N·m^{-3}·s$ and 6,000 $N·m^{-3}·s$, in particular about comprised between 2,000 $N·m^{-3}·s$ and 5,000 $N·m^{-3}·s$.

According to the invention, the porous stiffening layer 18 has a flexural stiffness B, reduced to a unit width, of more than 0.01 N·m, in particular comprised between 0.01 N·m and 10 N·m. This flexural stiffness B is for example greater than 0.1 N·m and in particular comprised between 0.1 N·m and 1 N·m.

The flexural stiffness B may also be greater than 1.5 N·m, in particular greater than 3 N·m; it may be comprised between 1.5 N·m and 2.5 N·m.

The flexural stiffness B is calculated by the equation:

$$B=E·h^3/12,$$

wherein h is the thickness of the layer 18, and E is its Young modulus.

The Young modulus or elasticity modulus is measured for example by the following method described in the NF EN ISO 527-3 standard.

The intermediate layer 16 is impervious to the passage of air. By <<impervious to the passage of air>>, is meant that its resistance to the passage of air is too high for it to be measured by the method described above.

The intermediate layer 16 has a thickness of less than that of the porous stiffening layer 18, advantageously a thickness of less than 50% of the thickness of the porous stiffening layer 18.

The intermediate layer 16 further has a thickness of less than 10% of the thickness of the base spring layer 14. The thickness of the intermediate layer 16 is for example less than 1 mm and in particular comprised between 0.1 mm and 0.8 mm.

The surface mass density of the intermediate layer 16 is greater than 50 $g/m^2$ and is in particular greater than 150 $g/m^2$, advantageously greater than 210 $g/m^2$. This surface mass density or thickness is in particular comprised between 250 $g/m^2$ and 400 $g/m^2$.

The surface mass density of this intermediate layer 16 is in any case less than 500 $g/m^2$, so as to be less than that of a conventional heavy mass layer. The layer 16 does not play the role of a heavy mass.

The intermediate layer 16 is assembled on the porous stiffening layer 18. Advantageously, the intermediate layer 16 is formed by a mixture of the foam forming the base spring layer 14 and of the porous material forming the porous stiffening layer 18, this material may be fibers or slitted foam as this was seen above.

The imperviousness of the intermediate layer 16 is obtained by thinning the pores or interstices made in the porous stiffening layer 18 by means of the injected foaming material during the making of the base spring layer 14.

The thickness of the intermediate layer 16 thus depends on the porosity of the porous layer 18, and on the applied pressure during the injection of the foam forming the base spring layer 14.

In one alternative, the intermediate layer 16 is formed with an impervious film coated on the porous layer 18, of the plastisol type. A plastisol is formed by the dispersion of a thermoplastic resin in a plasticizer. By heating this mixture, the molecules of plasticizer and of polymer become nested in each other, forming a flexible and impervious coating. The most widespread plastisols are based on PVC (polyvinyl chloride).

Alternatively, when the porous stiffening layer 18 is a textile essentially consisting of thermoplastic synthetic fibers, the intermediate layer 16 may be formed by calendering the textile in order to obtain local melting of the textile in contact with the calender to form an impervious film.

In another alternative, the impervious intermediate layer 16 is formed by extrusion of a thermoplastic material film over the porous layer in order to form an impervious layer with a mass of less than 500 $g/m^2$.

In further another alternative, the impervious intermediate layer 16 is formed by melting a dispersed material, for example a powdery material, dispersed beforehand over a surface of the porous stiffening layer 18.

Alternatively, the intermediate layer 16 may be a lightweight film with a basis weight of less than 150 $g/m^2$ of the same type as those used for avoiding penetration of the foam, provided that it perfectly adheres to the stiffening layer 18.

Without being bound to any theory, the inventors estimate that according to the invention, the impervious intermediate layer 16 assembled on the porous stiffening layer 18 provides, in combination with the base spring layer 14, a complex having insulation similar to that of a conventional mass-spring assembly.

This effect is obtained with an overall mass much smaller than or equal to that of the state-of-the-art assemblies. The total surface mass density of the assembly 10 is for example less than 2,500 $g/m^2$.

This assembly further has improved absorption as compared with a known assembly of the mass-spring type. Thus, when the intention is to provide additional absorption characteristics to this assembly by adding an absorbing porous layer, the weights to be applied will be less than in the case of the conventional mass-spring assembly.

Figure 2:
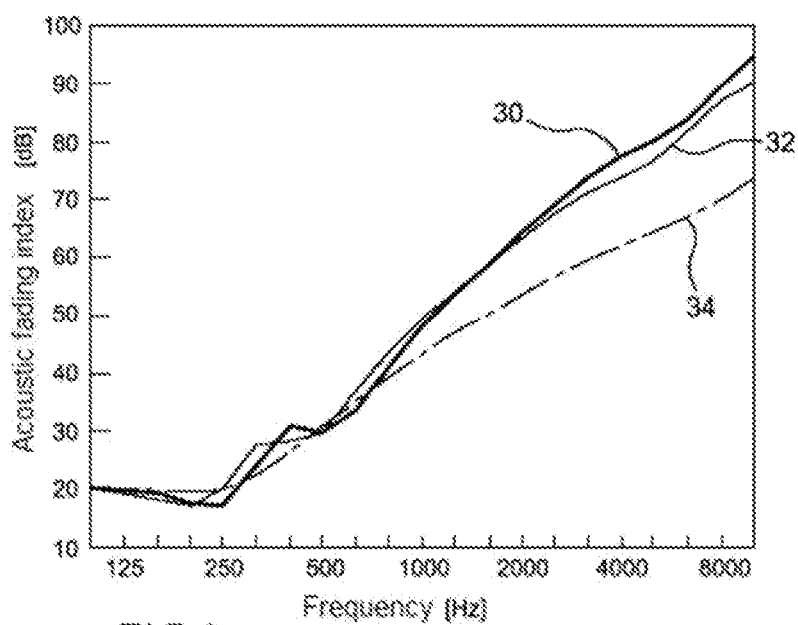
FIG. 2 is a graph illustrating the diffuse field attenuation index for an assembly according to the invention, as compared with that of a mass-spring assembly and compared with a bi-pervious assembly.

As an illustration, FIG. 2 illustrates a curve 30 illustrating the attenuation index in decibels, versus frequency, of the sound proofing assembly 10 as compared with the curve 32 of a conventional mass-spring type assembly.

The assembly 10 according to the invention includes a base spring layer 14 with a thickness equal to 20 mm and a density equal to 55 kg/m$^3$. The intermediate layer 16 is impervious to the passage of air. It has a thickness substantially equal to 0.8 mm and a surface mass density substantially equal to 320 g/m$^2$. The porous layer 18 has a flexural stiffness B, reduced to a unit width, equal to 0.52 N·m and a resistance to the passage of air equal to 3,500 N·m$^{-3}$·s.

The surface mass density of this layer 18 is 1,200 g/m$^2$ and its thickness is 4.2 mm.

The intermediate layer 16 is formed by impregnating the foam forming the base spring layer 14 in the porous layer 18.

The first assembly of the state of the art, illustrated by curve 32, is formed by a base spring layer 14 similar to the one of the assembly 10 according to the invention.

The intermediate layer 16 and the stiffening layer 18 are replaced with a single heavy mass layer with a mass equal to 1,500 g/m$^2$.

The second assembly of the state of the art, illustrated by curve 34 in FIG. 2 includes a base spring layer similar to the layer 14 described previously, and a stiffening layer 18 similar to the one of the sound proofing assembly 10 according to the invention. On the other hand it is without any impervious intermediate layer 16.

As illustrated in FIG. 2, the assembly according to the invention 10 has insulation comparable with that of a conventional mass-spring assembly. Surprisingly, it has significantly improved insulation as compared with a bi-pervious assembly of the state of the art.

Figure 3:
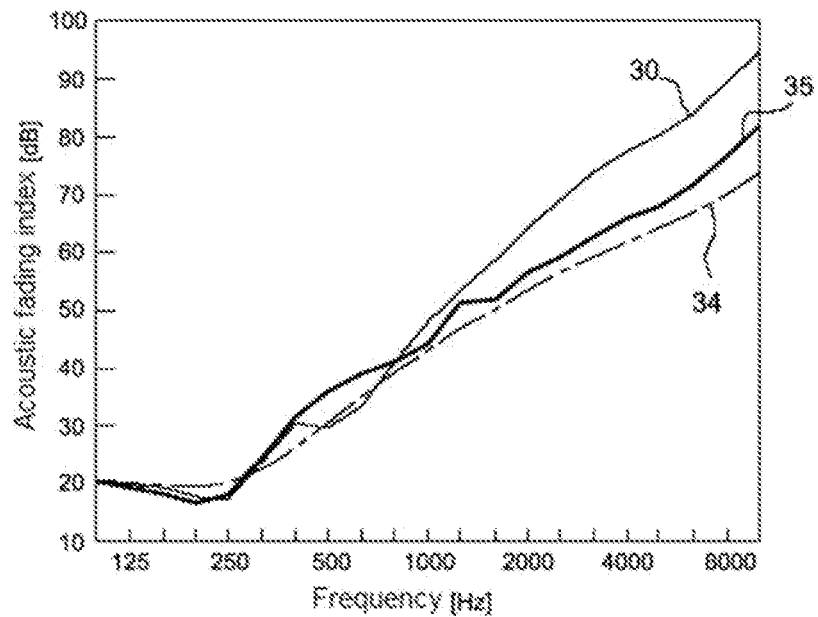
FIG. 3 is a graph illustrating the diffuse field attenuation index in decibels, versus frequency for an assembly according to the invention, as compared with an assembly having a stiffening layer of lower stiffness.

FIG. 3 illustrates the effect of the flexural stiffness B of the porous stiffening layer 18. As illustrated with FIG. 3, if the stiffening layer 18 has a flexural stiffness B below the claimed one (curve 35, on which the flexural stiffness of the complex is $6.25 \times 10^{-5}$ N·m), the insulation decreases very significantly.

Therefore the result from FIGS. 2 and 3 is that a synergistic effect is obtained between the stiffening layer 18 having a high flexural stiffness B on the one hand, and the impervious intermediate layer 16 for producing an acoustic effect equivalent to that of a heavy mass layer, on the other hand. This effect is obtained in a particularly surprising way.

Figure 4:
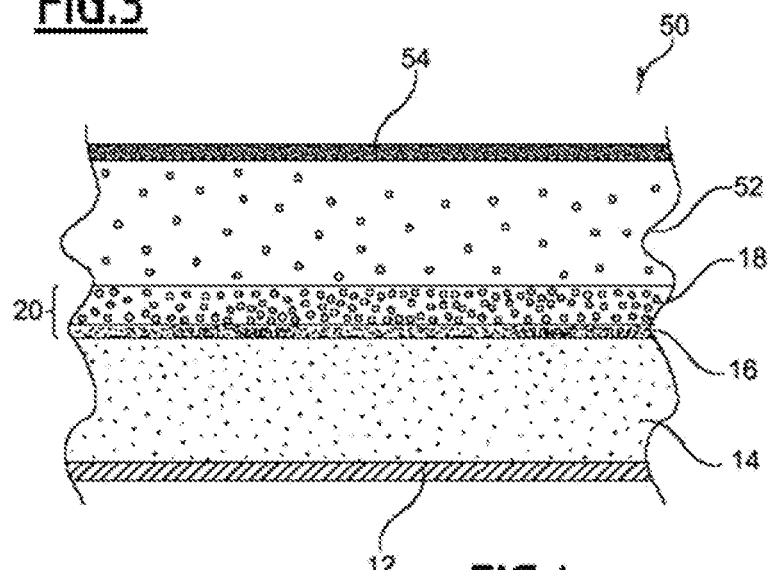
FIG. 4 is a similar view to FIG. 1 for a second assembly according to the invention.

A second sound insulation assembly 50 according to the invention is illustrated by FIG. 4. Unlike the first assembly 10, the second assembly 50 has an upper elastic porous layer 52 positioned on the porous stiffening layer 18 and advantageously an upper resistive layer 54.

The upper porous layer 52 is intended to have good absorption properties. It has resistivity to a passage of air comprised between 10,000 N·m$^{-4}$·s and 140,000 N·m$^{-4}$·s.

The thickness of the porous upper layer 52 is greater than that of the porous stiffening layer 18, for example greater than 150% of the thickness of the porous stiffening layer 18. This thickness is also greater than that of the intermediate layer 16.

The thickness of the upper porous layer 52 is for example greater than 5 mm, and is in particular comprised between 5 mm and 30 mm, in particular between 5 mm and 10 mm. In the example illustrated in FIG. 4, the upper porous layer 52 is formed by an absorbent felt.

The surface mass density of the layer 52 is for example comprised between 200 g/m$^2$ and 2,000 g/m$^2$, in particular between 200 g/m$^2$ and 800 g/m$^2$. The layer 52 is for example formed with a felt comprising microfibers, such as for example more than 50%, advantageously more than 80% by mass of microfibers, as defined above.

Alternatively, the upper porous layer 52 is made on the basis of a foam with open cells, for example in a foam with open cells of polyurethane. It is stifled. Alternatively, it contains recycled material, as defined above, or/and bio-polyol.

In this case, the specific gravity of the foam is for example comprised between 10 kg/m$^3$ and 80 kg/m$^3$, advantageously and substantially equal to 50 kg/m$^3$.

This foam may have high tortuosity, in particular greater than 1.4 and advantageously comprised between 1.4 and 3 as described in application WO-2007/006950 of the applicant. This tortuosity is measured by determining the slope of the curve illustrating the variation of the square of the refractive index for the acoustic wavelength used, versus the reciprocal of the square root of the frequency.

The resistive upper layer 54 is for example made on the basis of a resistive non-woven fabric or on a material having controlled resistance to the passage of air (for example a felt of low base weight, a preferably calendered textile etc.) attached on the porous layer 52.

It has a surface mass density comprised between 20 g/m$^2$ and 200 g/m$^2$, advantageously 100 g/m$^2$.

According to the invention, the resistive upper layer 54 is porous so as to have a low resistance to the passage of air comprised between 200 N·m$^{-3}$·s and 2,000 N·m$^{-3}$·s, advantageously comprised between 500 N·m$^{-3}$·s and 1,200 N·m$^{-3}$·s.

Figure 5:
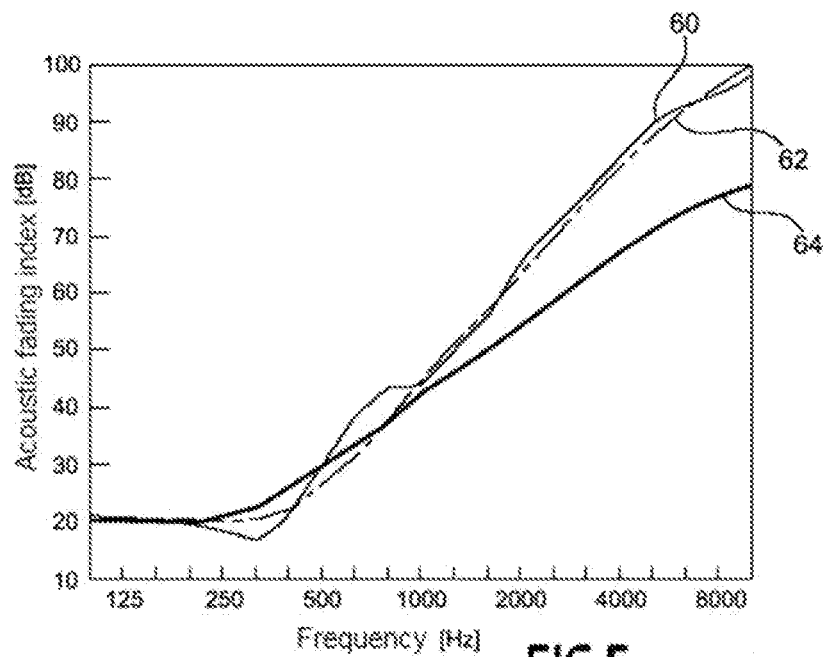
FIG. 5 is a similar view to FIG. 2 for the second assembly according to the invention.
Figure 6:
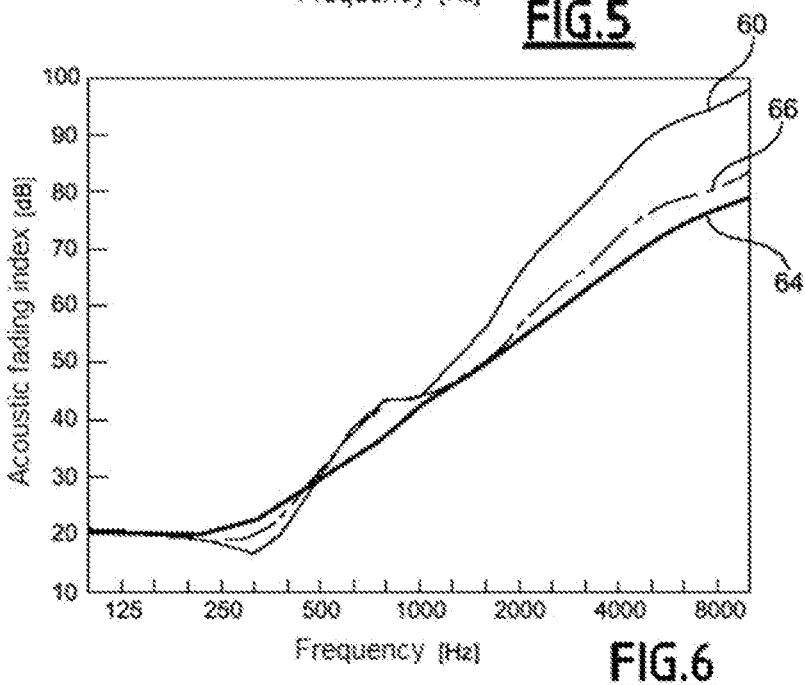
FIG. 6 is a view similar to FIG. 3 for the second assembly according to the invention.

FIGS. 5 and 6 illustrate the properties of the assembly 50 according to the invention, as compared with those of two assemblies of the state of the art.

The curve 60 illustrates the attenuation index versus frequency for a sound proofing assembly 50 as illustrated by FIG. 4. This assembly 50 comprises a base spring layer 14 with a thickness equal to 13 mm made in a polyurethane foam having a density of 55 kg/m$^3$.

The porous stiffening layer 18 has a thickness of 4.2 mm. It is made on the basis of a compressed felt having a surface mass density equal to 1200 g/m$^2$ and a flexural stiffness B equal to 0.52 N·m.

The intermediate layer 16 is made by impregnation of the foam forming the base spring layer 14 in the porous layer 18 so as to form an impervious layer with a surface mass density equal to 320 g/m$^2$, impervious to the passage of the air.

The elastic porous upper layer 52 has a thickness of 7 mm. It is made based on a felt with a surface mass density equal to 400 g/m$^2$.

The upper resistive layer 54 is made on the basis of a resistive non-woven fabric with a resistance to the passage of air equal to 1,000 N·m$^{-3}$·s.

As a comparison, the curve 62 illustrates the attenuation index of a <<Light Weight Concept>> assembly of the state of the art as described in WO2003/069596 comprising a felt layer with a surface mass density equal to 950 g/m$^2$, a heavy mass layer with a surface mass density equal to 1 kg/m$^2$, an upper felt porous layer with a surface mass density equal to 465 g/m$^2$, and a resistive non-woven fabric identical with the one of the resistive layer 54.

The attenuation index of the assembly according to the invention 50 is similar to that of the assembly of the state of the art.

Figure 7:
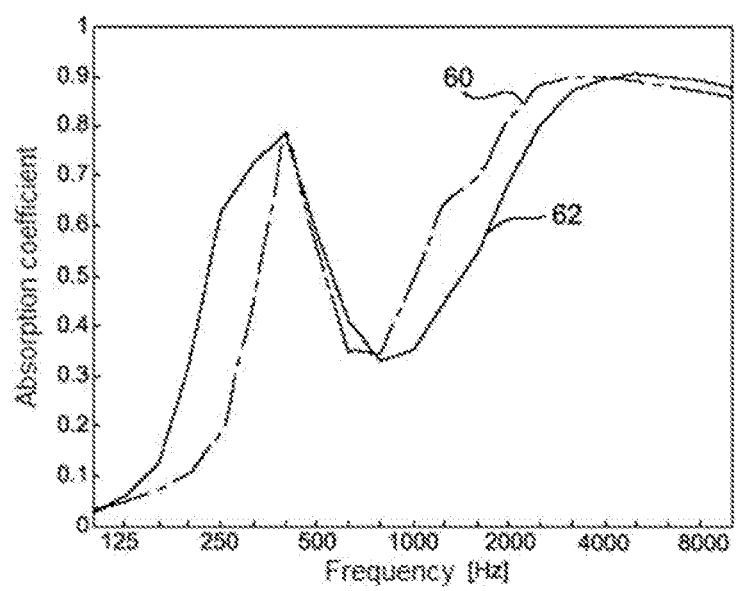
FIG. 7 is a graph illustrating the absorption coefficient versus frequency for the second assembly according to the invention and for a state-of-the-art four-layer assembly of the <<Light Weight Concept>> type.

The sound proofing assembly 50 according to the invention advantageously has a mass of less than 20% based on the mass of the assembly illustrated by the conventional mass-spring, which gives the possibility of lightening the vehicle and of reducing its consumption. In FIG. 7, the curve 60 of the assembly according to the invention further shows that this assembly 50 is more absorbing than the assembly of the state of the art illustrated by the curve 62 in the figure.

Moreover, in FIG. 6, the curve 64 illustrates the attenuation index of a quadri-pervious assembly of the state of the art including a felt base spring layer having a surface mass density equal to 750 g/m², a porous stiffening layer having a surface mass density equal to 1,400 g/m², a thickness equal to 5 mm and a flexural stiffness B similar to the one of the assembly 50 according to the invention. The quadri-pervious assembly further has an elastic porous upper layer in felt with a surface mass density equal to 400 g/m², and a resistive non-woven fabric identical with the one forming the resistive layer 54 of the assembly 50.

As illustrated by the curves, the attenuation index 60 of the assembly 50 according to the invention is substantially and surprisingly improved as compared with the assembly of the state of the art illustrated by curve 64.

Further, the curve 66 illustrated in FIG. 6 illustrates the attenuation index of an assembly similar to the one illustrated in FIG. 4, but wherein the stiffness of the stiffening layer 18 is less than 0.01 N·m.

As illustrated by this figure, the attenuation index 66 then remains comparable with the one of the quadri-pervious assembly of the state of the art, which illustrates the synergistic effect between the impervious layer 16 and the stiffening layer 18.

In one alternative, the first sound proofing assembly 10 includes a resistive layer 54 formed with a resistive non-woven fabric as described above.

In other alternatives, the base spring layer 14 is located at least partly away from the surface 12 of the automobile vehicle. A gas interstice is then defined between the surface 12 and the base spring layer. Such an arrangement may in particular exist when the surface 12 is a floor bottom of an automobile vehicle or an upper portion of a wheel passage.

In the case when the assembly 10 is positioned in a wheel passage, it may further be covered with a protective layer formed by a bi-web or by a carpet of the flat needled type which may have a particular features, for example hydrophobic and/or lipophobic properties and/or those of hydro-repellency and/or fluid-resistance and/or gravel projection resistance.

In one alternative, a decorative layer formed by a carpet or a decoration is applied above the resistive layer 54 when it is present, or directly above the porous upper layer 52 in the absence of any resistive layer 54.

An intermediate film intended to achieve imperviousness to water may be interposed between the porous layer 52 and the decorative layer.

In one alternative (not shown) of the assembly 10, a decorative layer formed with a carpet or a textile decoration is applied above the porous stiffening layer 18.

The carpet for example includes a porous base layer and a plurality of verticalized loops.

More generally, the assembly according to the invention may be used in another vehicle such as an aircraft or a railway transport vehicle, or in a fixed structure such as a building.

The invention claimed is:

1. A sound proofing assembly, comprising:
    an elastic and porous base spring layer, configured to be placed facing a surface;
    an intermediate insulation layer impervious to the passage of air, the intermediate layer being positioned on the base spring layer;
    the impervious intermediate layer having a surface mass density of less than 500 g/m², the sound proofing assembly including a porous stiffening layer positioned in contact with the impervious intermediate layer, the porous stiffening layer having a smaller thickness than the thickness of the base spring layer and a flexural stiffness, reduced to a unit width, of greater than 3.0 N.m.

2. The assembly according to claim 1, wherein the surface mass density of the porous stiffening layer is greater than 400 g/m².

3. The assembly according to claim 1, wherein the surface mass density of the impervious intermediate layer is greater than 210 g/m².

4. The assembly according to claim 1, including a porous upper layer positioned on the porous stiffening layer, the porous upper layer having a greater thickness than that of the porous stiffening layer.

5. The assembly according to claim 4, including an outer resistive layer having a resistance to the passage of air comprised between 200 N.m$^{-3}$.s and 1200 N.m$^{-3}$.s.

6. The assembly according to claim 4, including a decorative layer, advantageously formed by a carpet or a textile decoration, the decorative layer being positioned above the porous upper layer, or above the outer resistive layer.

7. The assembly according to claim 1, including a decorative layer, applied above the porous stiffening layer.

8. The assembly according to claim 1, wherein the impervious intermediate layer has a smaller thickness than the thickness of the porous stiffening layer.

9. The assembly according to claim 1, wherein the base spring layer is formed with a porous foam layer, the impervious intermediate layer being formed by impregnation of the foam forming the base spring layer in the porous stiffening layer.

10. The assembly according to claim 1, wherein the impervious intermediate layer is formed by a layer extruded on the porous stiffening layer.

11. The assembly according to claim 1, wherein the impervious intermediate layer is formed by melting a dispersed material deposited on the porous stiffening layer, or by local melting of the porous stiffening layer.

12. The assembly according to claim 1, wherein the resistance to passage of air of the porous stiffening layer is comprised between 400 N.m$^{-3}$.s and 6,000 N.m$^{-3}$.s.

13. The assembly according to claim 1, wherein the thickness of the porous stiffening layer is less than 70% of the thickness of the base spring layer, the thickness of the airproof intermediate layer being less than or equal to the thickness of the porous stiffening layer.

14. An automotive vehicle comprising an assembly according to claim 1.

15. The assembly according to claim 1, wherein the thickness of the porous stiffening layer is between 20% and 50% of the thickness of the base spring layer.

* * * * *